(12) United States Patent
Juranitch et al.

(10) Patent No.: US 12,195,358 B2
(45) Date of Patent: Jan. 14, 2025

(54) PRODUCED WATER EVAPORATION SYSTEM

(71) Applicant: HEAT IP HOLDCO, LLC, Aberdeen (GB)

(72) Inventors: James C. Juranitch, Fort Lauderdale, FL (US); Alan C. Reynolds, Novi, MI (US)

(73) Assignee: HEAT IP HOLDCO, LLC, Aberdeen (GB)

( * ) Notice: Subject to any disclaimer, the term of this patent is extended or adjusted under 35 U.S.C. 154(b) by 53 days.

(21) Appl. No.: 17/634,329

(22) PCT Filed: Aug. 12, 2020

(86) PCT No.: PCT/US2020/045918
§ 371 (c)(1),
(2) Date: Feb. 10, 2022

(87) PCT Pub. No.: WO2021/030429
PCT Pub. Date: Feb. 18, 2021

(65) Prior Publication Data
US 2022/0356078 A1    Nov. 10, 2022

Related U.S. Application Data

(60) Provisional application No. 62/885,663, filed on Aug. 12, 2019.

(51) Int. Cl.
C02F 1/04 (2023.01)
B01D 1/20 (2006.01)
(Continued)

(52) U.S. Cl.
CPC .................. *C02F 1/12* (2013.01); *B01D 1/20* (2013.01); *C02F 1/40* (2013.01); *C02F 1/4674* (2013.01);
(Continued)

(58) Field of Classification Search
CPC .. C02F 1/12; C02F 1/40; C02F 1/4674; C02F 2103/10; C02F 2303/04; B01D 1/20
See application file for complete search history.

(56) References Cited

U.S. PATENT DOCUMENTS 4,449,849 A * 5/1984 Horn ..................... E21B 21/065
  405/52
4,713,172 A * 12/1987 Horn ....................... C02F 1/048
  210/197

(Continued)

FOREIGN PATENT DOCUMENTS

WO     2017/151635 A1    9/2017
WO     WO-2019043982 A1 * 3/2019 ............... B01D 1/20

*Primary Examiner* — Jonathan Miller
(74) *Attorney, Agent, or Firm* — LAW OFFICE OF JESSE D. LAMBERT, LLC

(57) ABSTRACT

Embodiments of the present disclosure relate generally to a method, apparatus and system for the evaporation of produced water and dirty water from oil and gas production and other dirty water sources. The evaporation system may consist of a portable pond embodied in an Above Ground Storage Tank (AST) system and a fluid projection system which may be controlled and employ optimized operating conditions to maximize the evaporation of produced water under varying meteorological and chemical condition.

11 Claims, 5 Drawing Sheets

(51) Int. Cl.
   *C02F 1/12*   (2023.01)
   *C02F 1/40*   (2023.01)
   *C02F 1/467*   (2023.01)
   *C02F 101/32*   (2006.01)
   *C02F 103/10*   (2006.01)

(52) U.S. Cl.
   CPC ...... *C02F 2101/32* (2013.01); *C02F 2103/10* (2013.01); *C02F 2303/04* (2013.01)

(56) References Cited

U.S. PATENT DOCUMENTS

| | | | | |
|---|---|---|---|---|
| 6,200,428 | B1* | 3/2001 | VanKouwenberg | C02F 1/048 202/160 |
| 7,722,739 | B2* | 5/2010 | Haslem | E21B 21/063 202/83 |
| 8,016,977 | B2* | 9/2011 | Rasmussen | B05B 1/202 159/901 |
| 8,425,668 | B2* | 4/2013 | Lakatos | B03D 1/1462 95/266 |
| 9,890,057 | B2* | 2/2018 | Houston | B05D 1/02 |
| 11,220,439 | B2* | 1/2022 | Lee | C02F 1/10 |
| 2007/0235146 | A1* | 10/2007 | Haslem | E21B 21/063 159/48.1 |
| 2010/0139871 | A1* | 6/2010 | Rasmussen | B01D 1/20 159/4.01 |
| 2014/0174672 | A1* | 6/2014 | Boulter | B01D 1/0005 159/4.2 |
| 2016/0221842 | A1* | 8/2016 | Rau, III | C02F 1/40 |
| 2016/0362307 | A1* | 12/2016 | Shiner | C02F 1/048 |
| 2019/0314735 | A1* | 10/2019 | Ballantyne | C02F 1/14 |

* cited by examiner

PRODUCED WATER EVAPORATION SYSTEM

CROSS-REFERENCE TO RELATED APPLICATIONS

This application is a national stage filing based upon international application no. PCT/US2020/045918, filed 12 Aug. 2020 and published in on 18 Feb. 2021 under international publication no. WO 2021/030429 (the '918 application). This application claims the benefit of U.S. provisional application No. 62/885,663, filed 12 Aug. 2019 (the '663 application). The '918 application and the '663 application are both hereby incorporated by reference as though fully set forth herein.

FIELD OF THE INVENTION

Embodiments of the present disclosure relate generally to a method, apparatus and system for the evaporation of produced water from oil and gas production and other dirty water sources.

BACKGROUND

Cleaning up and disposing of contaminated water from any source is becoming a bigger issue as the world attempts to evolve to volume reduction through brine concentration or a Zero Liquid Discharge (ZLD) philosophy. Many industries are challenged by the economics of dirty water management and disposal. The Hydraulic Fracturing hydrocarbon recovery process has proven to be an effective way of recovering fossil energy. However, it is not without negative issues, especially related to contaminated water disposal. The Hydraulic Fracturing hydrocarbon recovery process can be associated with a larger disposal requirement to dispense with frac return water and fossil water or salt laden brine water, which is returned during the fracing process and the balance of the hydrocarbon recovery process.

The fossil water which is returned is known as "produced water" and can contain large amounts of salts. In some cases, the amount of salt contained in the produced water can be over 200,000 ppm of salts. To date, the most prevalent practice for produced water disposal is deep well injection. The produced water is effectively pumped deep into the ground. Unfortunately, it appears this process has precipitated seismic events or earth quakes in a number of locations, field and well over pressurization, well souring and producing well cross contamination. Deep well injection can be very costly in many basins. It is also becoming difficult to acquire permits to drill new deep wells for waste water injection.

At this time, produced water disposal is becoming one of the more costly factors related to gas and oil production in a number of basins. Many types of water disposal are currently being used and tested, including chemical treatment and re-use for fracing, thermal evaporation, evaporation through mechanical vapor compression and multiple effect systems. Membrane and reverse osmosis treatments are not typically used for produced water due to the high levels of salts present in most produced water basins.

Open ponds can be used to promote produced water evaporation, however, such ponds can be difficult to permit in most basins and can be limited in their ability to evaporate produced water. Furthermore, it can be difficult to clean out the inevitable precipitated salts that occur in open ponds. Ground water contamination and water fowl destruction are also significant issues.

The fracing market is transient in its operating locations. Producing wells have a short life, with their prime hydrocarbon production lasting less than 5 years, in many cases. Conventional ponds are difficult, expensive and impractical to close down, remediate and move.

A dry pond system, as described in U.S. Pat. No. 8,016,977 B2 has been tested to attempt to accelerate evaporation over the amount observed in conventional ponds per square area. Unfortunately, the dry pond is limited in its ability to evaporate produced water due to many conditions including its need to always be in a balanced condition of water injected into the air versus water that falls back to the membrane surface.

Some conventional ponds have installed air misters to promote evaporation. Unfortunately, these air misters produce a vapor or particulate trail that can travel an unacceptable distance especially during windy conditions causing particulate emissions problems. The air/fluid mixing systems in these units are also prone to clogging when operating on produced water, due to their small size particle generation.

A more effective water disposal system is needed, which is described in this disclosure.

DETAILED DESCRIPTION

Embodiments of the present disclosure relate generally to a method, apparatus and system for the evaporation of produced water from oil and gas production and other dirty water sources. Embodiments of the present disclosure can be used in the enhanced oil recovery industry in processes such as Hydraulic Fracturing, or any other application which requires large quantities of contaminated water to be treated and/or disposed of.

Figure 1:
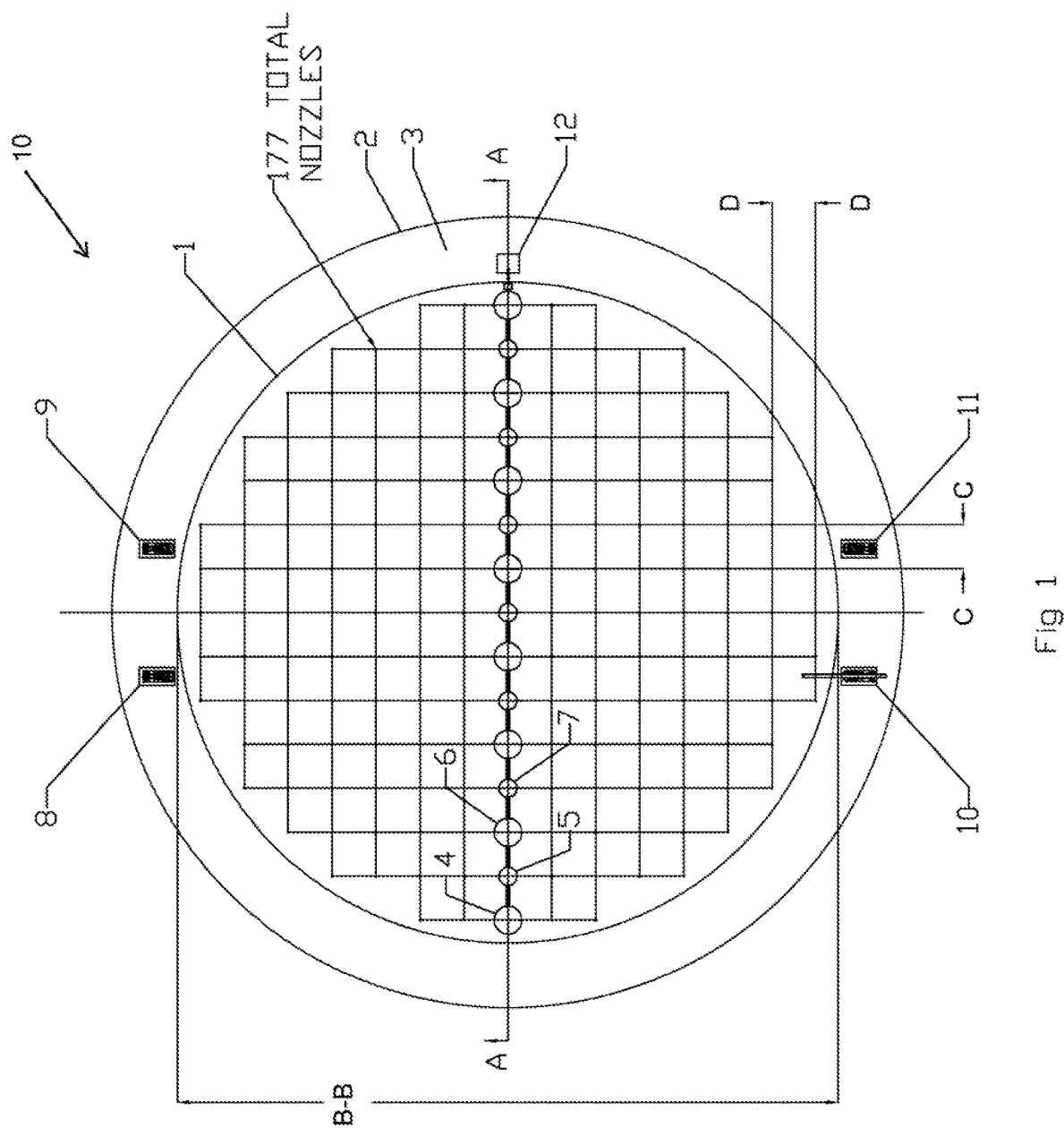
FIG. 1 depicts a plan view of a produced water evaporation apparatus and system, in accordance with embodiments of the present disclosure.

FIG. 1 depicts a plan view of a produced water evaporation apparatus and system 10, in accordance with embodiments of the present disclosure. Embodiments of the present disclosure can include an above ground storage tank (AST) 1. The AST 1 can include a retaining wall, which defines a perimeter of the AST 1. The AST 1 can be used in oil fields and can come in many sizes. As depicted, the AST 1 can be approximately 150 feet in diameter, as represented by line B-B, although the AST 1 can be of a smaller or larger diameter than 150 feet.

The AST 1 can be erected quickly, sometimes in a matter of days, and can be easily disassembled and moved. The AST1 can be constructed with integrated fluid barriers that include single or multiple linings and/or water retention systems. In some embodiments, the fluid barriers can be plastic liners and/or membranes of considerable strength and durability. The AST 1 can be enclosed by a fixed or movable roof and/or can be open. In some embodiments, the AST 1 can be screened in on its exposed surface to resist waterfowl interaction. In some embodiments, the AST 1 can be equipped with a sound system and/or other systems that are viewed by waterfowl as threatening, to reduce the risk of waterfowl interaction with the contents of the AST 1. The AST 1 can include a second retaining wall 2, which may be part of an independent fluid retention system or may be part of one of the fluid barriers already employed in AST 1. A retention volume 3 can be defined between the AST 1 and the second retaining wall 2, which can help to minimize the risk of fluid being spilled or misted from the area enclosed by the AST 1, thus preventing contamination of the areas surrounding the AST 1.

A network of spray systems can be disposed within a perimeter of the retaining wall that defines the AST 1. The network of spray systems can include one or more nozzles that can spray produced water. The number, spacing, and/or configuration of the nozzles can be varied. For example, the one or more nozzles can be configured to have a spray plume shape that includes at least one of a flat fan, mist fan, full cone, hollow cone, among other types of spray plume shapes. As depicted, the AST 1 can include spray systems 4, 5, 6 and 7. The spray systems 4, 5, 6, and 7 can have an infinite combination of flows, heights, and spray plume shapes, as depicted. For ease of illustration, the reference numbers 4, 5, 6, and 7 point to spray plumes that are produced by nozzles associated with the spray systems. For example, a different fluid flow can be provided to one or more of the spray systems 4, 5, 6, and 7, one or more of the spray systems can extend a different height above the AST 1, and/or one or more of the spray systems can be configured to have a different spray plume pattern shape. The pattern of fluid flow, height, and/or spray plume pattern shape may or may not repeat in the balance of the spray systems situated at each set of intersecting lines shown in FIG. 1 and specifically inside the area enclosed by the retaining wall that defines the AST 1. Some embodiments of the present disclosure can include a spray plume pattern shape control and altitude control. For example, the spray plume pattern shape and/or altitude of the spray plume can be varied by increasing and/or decreasing a flow and/or pressure of fluid through the one or more nozzles. In the example of the quantity of fluid projection systems and the spray plume or projection control and altitude control of the fluid spray plumes shown in FIGS. 1 and 2, the system and apparatus can evaporate over 1,000 barrels per day of produced water when residing in the Permian Basin. If the diameter of the system and apparatus is reduced by 50% the resulting system and apparatus will evaporate over 500 barrels per day of produced water when residing in the Permian Basin.

Although only spray systems 4, 5, 6, 7 are labeled in FIG. 1, spray systems can be located at the intersection of the vertical lines and horizontal lines located within the perimeter of the AST 1. As depicted, the AST 1 can include 177 spray systems with individual nozzles, however, the number of spray systems (e.g., nozzles) can be greater than or less than 177. In some embodiments, an individual spray system can include one or more nozzles. As further depicted in FIG. 1, in some embodiments, the vertical lines (e.g., representative of nozzle spacing in a first direction) can be spaced apart by approximately 10 feet, represented by line C-C, although spacing between nozzles can be closer or further than 10 feet. As further depicted in FIG. 1, in some embodiments, the horizontal lines (e.g., representative of nozzle spacing in a second direction) can be spaced apart by approximately 10 feet, represented by line D-D, although spacing between nozzles can be closer or further than 10 feet.

Figure 2:
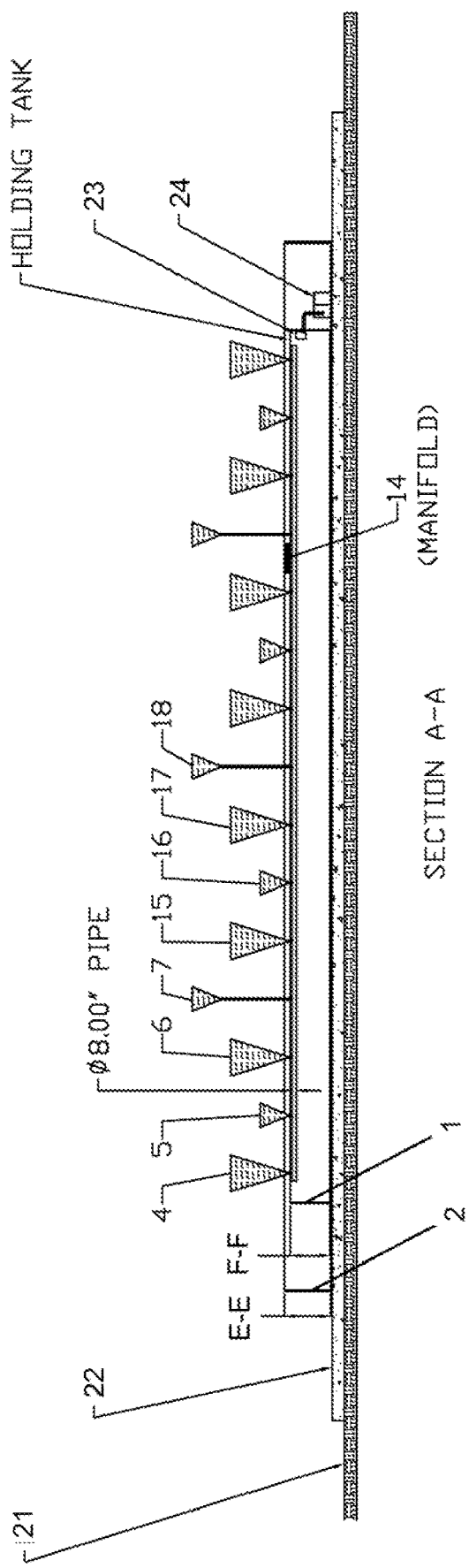
FIG. 2 depicts a cross-sectional side view of the produced water evaporation apparatus and system depicted in FIG. 1, in accordance with embodiments of the present disclosure.
Figure 3:
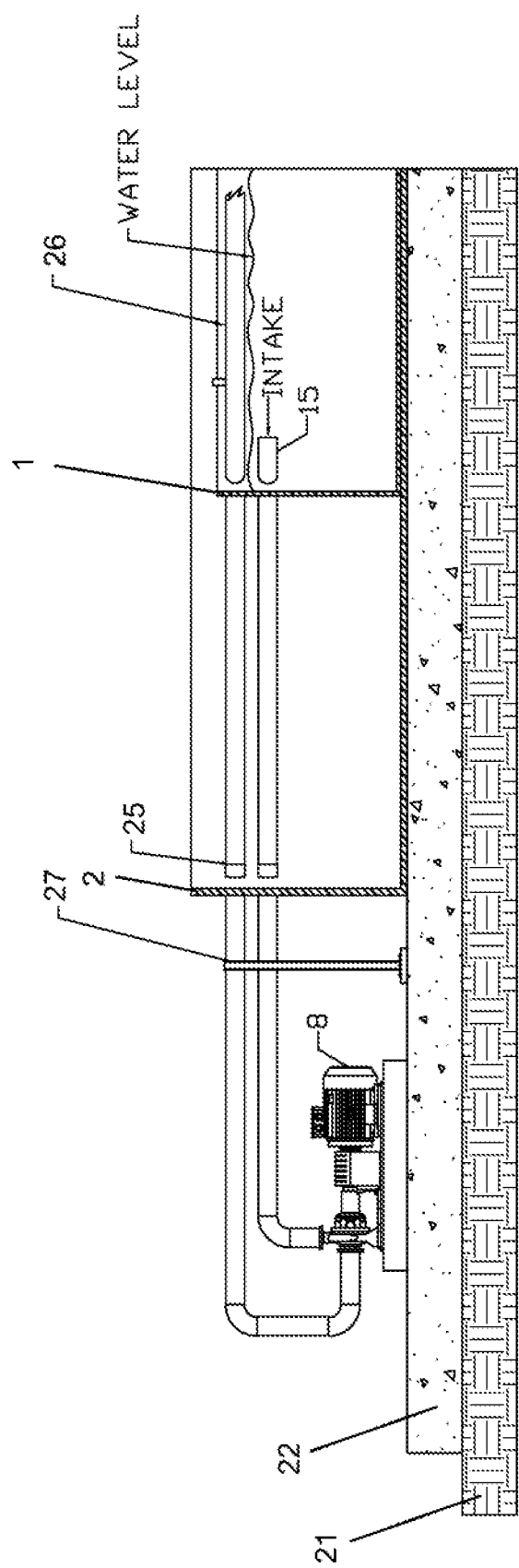
FIG. 3 depicts a close up view of a pump for the produced water apparatus and system depicted in FIGS. 1 and 2, in accordance with embodiments of the present disclosure.
Figure 4:
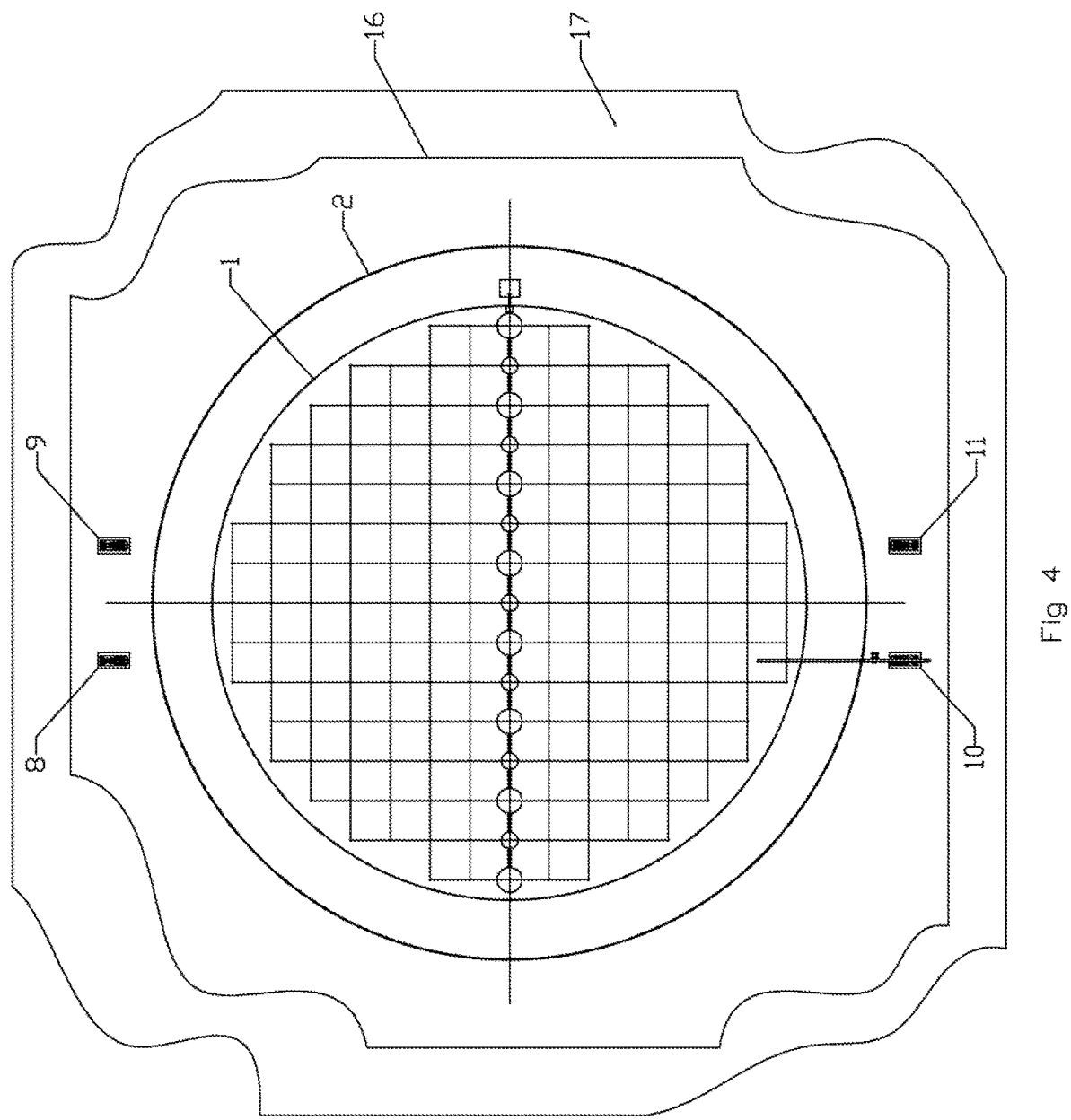
FIG. 4 depicts a plan view of a produced water evaporation apparatus and system that includes a redundant containment area, in accordance with embodiments of the present disclosure.
Figure 5:
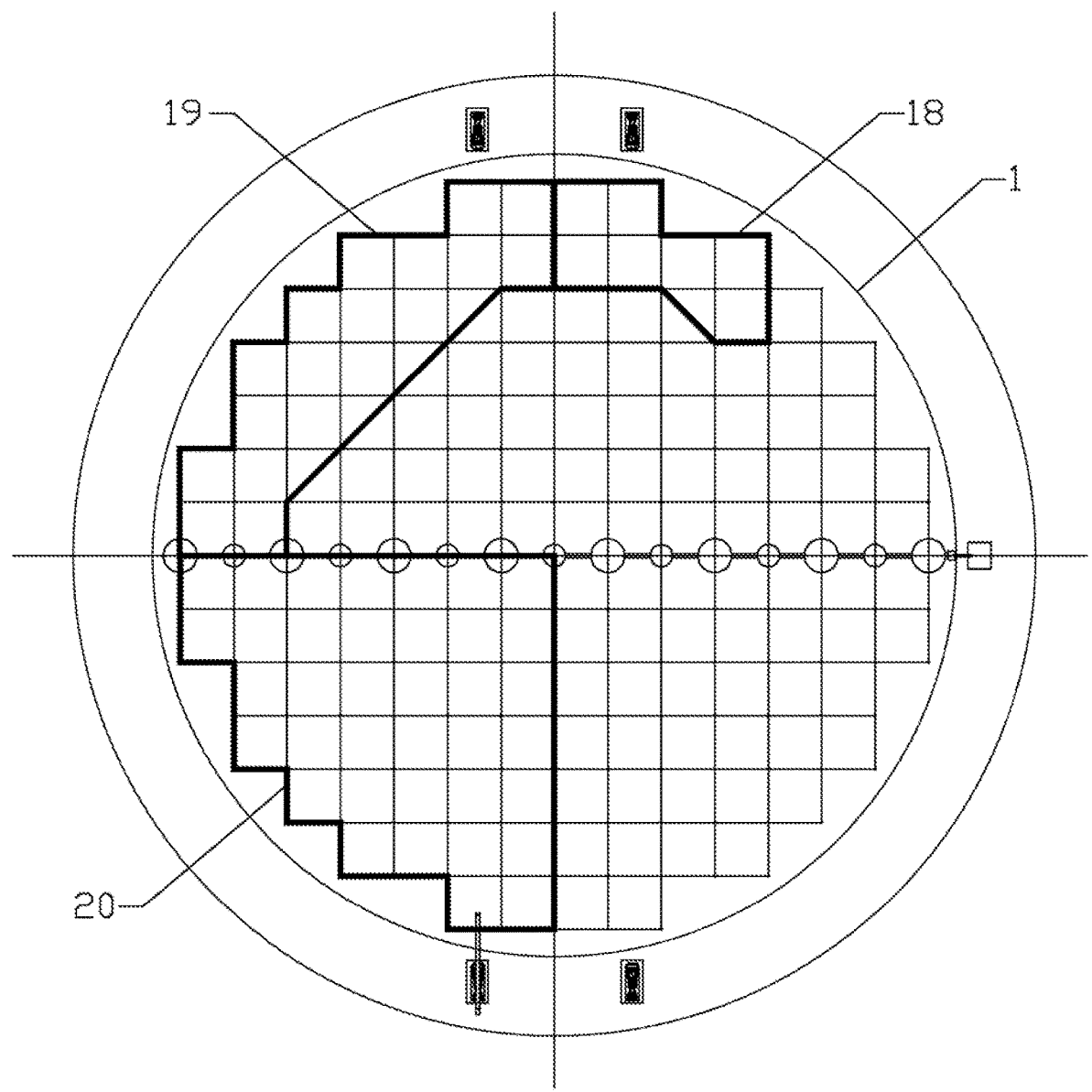
FIG. 5 depicts a plan view of the apparatus and system showing some examples of mist control sectors, in accordance with embodiments of the present disclosure.

In some embodiments, the AST 1 can include a plurality of fluid pumping systems 8, 9, 10, and 11. In an example, the fluid pumping systems 8, 9, 10, and 11 can be disposed in a retention area 3 between the retaining wall that defines the AST 1 and the second retaining wall 2, as depicted. These pumping systems 8, 9, 10, and 11 can include pumps that are driven by any power source, for example, such as electricity or fossil fuel prime movers including a turbine and/or internal combustion engine. In some embodiments, it is desirable that the pumping systems 8, 9, 10, and 11 can vary their flow and pressure. For example, the fluid flow and/or pressure generated by the pumping systems 8, 9, 10, and 11 can be varied to adjust the spray plume pattern shape and/or altitude of the spray plume. In some embodiments, one or more of the pumps associated with the pumping systems 8, 9, 10, and 11 may be disposed in the retention area 3, as shown in FIG. 1. In some embodiments, one or more of the pumps associated with the pumping systems 8, 9, 10, and 11 may be in a more remote area or retention system. It is desirable for the pumping systems 8, 9, 10, and 11 to draw fluid from a location below the surface water of the AST 1, but above the altitude where solids accumulate. This condition is shown in FIG. 3, in relation to the representative pump inlet 15. FIG. 3 depicts a close up view of a pump for the produced water apparatus and system, as depicted in FIGS. 1 and 2, in accordance with embodiments of the present disclosure. As depicted, the pump inlet pipe 15 can be disposed above the bottom of the AST 1 and can travel through the wall of the AST 1 and through the second retaining wall 2 to the intake portion of the pump 8. A pump outlet pipe 26 can be fluidly coupled with the outlet of the pump and extend through the second retaining wall 2 and the wall of the AST 1 to a distribution header (e.g., manifold 14, as depicted and described in relation to FIG. 2). In some embodiments, a fluid tight seal 25 can be formed between the interface of the pump outlet pipe 25 and the second retaining wall 2. The fluid tight seal 25 can prevent fluid that has drifted via wind and/or overflowed from the AST 1 from escaping the area contained by the second retaining wall 2. A fluid tight seal 25 can also be formed between the interface of the pump inlet pipe 15 and the second retaining wall 2, although not labeled. In some embodiments, a pipe support 27 can be disposed between the second retaining wall 2 and the pump 8, to support the pump inlet pipe 15 and the pump outlet pipe 25.

In some embodiments, the AST 1 can include a separator 12, which can be a hydrocarbon or oil and water separator and/or skimmer. In most cases hydrocarbons which have commercial value are entrained in the produced water being held by the AST 1. They continue to separate due to fluid density and other motives in the AST 1 and are desirable to finally collect and separate out to be used for beneficial purposes. Thus, the separator 12 can separate hydrocarbons from the produced water being held in the AST 1.

FIG. 2 is a cross-sectional side view of the AST 1, along line A-A, depicted in FIG. 1, in accordance with embodiments of the present disclosure. As mentioned, the AST 1 can include spray systems 4, 5, 6 and 7 that utilize nozzles, which in some embodiments can be self-cleaning nozzles, in nature. In some embodiments, the nozzles associated with spray systems 4, 5, 6 and 7 can be air augmented. In some embodiments, spray plume pattern shape and/or an altitude of the spray plume can be altered between the nozzles associated with spray systems 4, 5, 6 and 7. In some embodiments, the spray plume pattern shape can be adjusted by increasing and/or decreasing a flow and/or pressure of fluid provided to the nozzles associated with spray systems 4, 5, 6 and 7 and/or through use of a nozzle configured to provide a particular spray plume pattern shape.

The pattern produced by the nozzles associated with spray systems 4, 5, 6 and 7 can be repeated as shown with respect to the nozzles associated with spray systems 15, 16, 17 and 18. In some embodiments, the goal can be to implement a system that maximizes the exposed surface area and temperature difference between the fluid to be evaporated and the wet bulb temperature of the surrounding atmosphere. In order to accomplish this, the particle size of the projected fluid shown emanating from any nozzle can be minimized without creating an environment for clogging and the particles can be large enough to not form a particulate cloud that drifts past the AST 1 and the retention area 3, as depicted in FIG. 1. Wind and other environmental conditions can affect the optimum size, shape, height and density of the spray plumes emanating from the nozzles in the AST 1. Nozzles that are self-cleaning that can be implemented in FIG. 2 can include; air atomizing nozzles, axial flow hollow cone nozzles, tangential flow hollow cone nozzles, full cone nozzles, spillback nozzles, laval nozzles and others known to those skilled in the art. The nozzle spray plume may be made up of fluid particles of the predominant diameter of 0.01 to 1 millimeters or more desirably from 0.1 to 0.3 millimeters.

In some embodiments, the nozzle systems and manifold systems shown in FIG. 2 as spray systems 4, 5, 6, 7, 15, 16, 17, 18 and manifold 14 can float on top of the produced water or can be fixed to the walls of the AST 1, or a combination of both. In an example, one or more manifolds 14 can be included in the AST 1 for fluidly coupling the various strings of nozzles together.

As depicted in FIGS. 2 and 3, the AST 1 can be built on existing soil 21. In some embodiments, a compacted foundation 22 can be disposed under the AST 1 and any secondary retaining walls (e.g., secondary retaining wall 2). As depicted, in some embodiments, the wall of the AST 1 can be approximately 7 feet tall, however, the wall of the AST 1 can be shorter or taller than 7 feet. In some embodiments, the secondary retaining wall 2 can be approximately 12 feet tall, however, the secondary retaining wall can be shorter or taller than 12 feet. In some embodiments, as discussed, the AST 1 can include a skimmer 23 and/or an oil/water separator 24.

Wind and temperature sensors that relate to wind direction, wind velocity, dry and wet bulb conditions and other meteorological metrics can be used to control the individual nozzle fluid particle size, spray plume shape, spray plume height and density. The particle size can be the size (e.g., diameter) of individual particles that form the spray generated by the one or more nozzles. The spray plume shape can be an overall shape of the spray plume when viewed from the side or from above the spray plume. The spray plume height can be the height of the spray plume above the nozzle and/or above a surface of fluid held in the AST 1. The density of the spray plume can be an amount of fluid per volume of the spray plume In an example, in some embodiments, in response to a velocity of the wind increasing, a fluid particle size can be increased, height, and/or density can be decreased, which can prevent fluid particles from escaping the confines of the AST 1 and/or the retention area 3, while maximizing evaporation. In response to a velocity of the wind decreasing, a fluid particle size can be decreased, height, and/or density can be increased, which can prevent fluid particles from escaping the confines of the AST 1 and/or the retention area 3, while maximizing evaporation. In some embodiments, in response to a wind direction, height, and/or density associated with downwind spray systems can be decreased and/or a fluid particle size associated with the downwind spray systems can be increased, to avoid fluid particles from escaping the confines of the AST 1 and/or the retention area 3. In some embodiments, in response to a difference between a dry and wet bulb condition decreasing, the fluid particle size and height can be increased and a density of the spray plume can be decreased. In response to a difference between a dry and wet bulb condition increasing, the fluid particle size and height can be decreased and a density of the spray plume can be increased. The brine concentration as measured in the AST 1 may also be factored into the control optimization. In an example, as a concentration of the brine increases, a fluid particle size of the spray plume can be decreased, a height of the spray plume can be increased, and a density of the spray plume can be decreased. In an example, as a concentration of the brine decreases, a fluid particle size of the spray plume can be increased, a height of the spray plume can be decreased, and a density of the spray plume can be increased.

Sectors of nozzles can be controlled by all of the aforementioned parameters to optimize evaporation and minimize over spray into undesirable areas. For ease of illustration, the meteorological measurement systems, brine concentration measurement system and nozzle controllers have been excluded in the figures. One or more microprocessors, chemical sensors, variable speed pumps, solenoid and/or valve banks comprise the inner workings of these control systems that are programmed to react to the changing meteorological conditions and chemical makeup of the process fluid, such as the brine concentration contained in the AST 1. For example, the various sensors, pumps, solenoid and/or valve banks can be electrically connected to one or more computers that include a processor and memory that stores instructions that are executable by the processor to perform one or more actions (e.g., control a speed of a pump, etc.).

As further depicted in FIG. 2, in some embodiments, the spray systems 4, 5, 6, 7, 15, 16, 17, 18 can be arranged such that the spray plume shape, spray plume height, and/or spray plume particle diameter can be varied for adjacent spray systems. In an example, with reference to a first spray system 4 and second spray system 5, the spray plume height, diameter, and/or particle size of the first spray system 4 can be greater than the spray plume height, diameter, and/or particle size of the second spray system 5. In an example, the spray plume associated with the first spray system 4 can cause properties of the air that is adjacent to the spray plume to be affected. For example, the spray plume associated with the first spray system 4 can change the temperature of air that is adjacent to the spray plume due to heat transfer and evaporative effects, for example. Accordingly, the second spray system 5 can have a smaller spray plume, such that the air into which the smaller spray plume is ejected is not affected by the spray plume associated with the first spray system 4. As depicted, the spray systems (e.g., nozzles) can be arranged to vary the spray plume shape of the spray generated by the spray systems, the spray plume height of the spray generated by the spray systems, and/or the spray plume particle diameter of the spray generated by the spray plume nozzles. In some embodiments, as illustrated with the spray systems 7 and 18, a height at which the nozzle is disposed can be varied. As depicted, the spray systems 7 and 18 can be disposed higher above the surface of the fluid held by the AST 1 to ensure that the air surrounding the spray plume is not affected by adjacent spray plumes. In some embodiments, a height of the spray systems (e.g., height at which associated nozzles are disposed) can be increased towards a center of the AST 1, as depicted with respect to spray systems 7 and 18. This can help to increase evaporation of the fluid since the fluid falls back a further distance to the fluid surface of the AST 1. In addition, wind drift of the fluid outside of the AST 1 from spray systems 7 and 18 can be minimized, because the spray systems 7 and 18 are located further towards the center of the AST 1, allowing for the fluid to have a greater distance to settle back to the fluid surface of the AST 1.

FIG. 4 depicts a plan view of a produced water evaporation apparatus and system that includes a redundant containment area, in accordance with embodiments of the present disclosure. An additional membrane 16 can be included to provide another redundant containment area for the fluids in the containment area located within the perimeter of the retaining wall that defines the AST 1. In some embodiments, the pumps 8, 9, 10, and 11 can be located in this example in the additional redundant containment area. In some embodiments, an embankment 17 or other type of barrier (e.g., retaining wall) can be built to incorporate the fluid and particulate mist retention and sealing characteristics of membrane 16, as shown in FIG. 4.

FIG. 5 depicts a plan view of the produced water evaporation apparatus and system that includes nozzle areas, also referred to as AST nozzle sections, that could be independently controlled to be optimized for evaporation under varying meteorological conditions, in accordance with embodiments of the present disclosure. The individual nozzle fluid particle size, spray plume shape, spray plume height and/or density could be varied per section or any combination of sections included in the AST 1. An infinite combination of sections and optimizations are possible. As depicted, the number of spray systems (e.g., nozzles) included in each AST nozzle section can vary. For example, AST nozzle section 18 can have fewer nozzles than the number included in AST nozzle section 19, and AST nozzle section 19 can have fewer nozzles than the number included in AST nozzle section 20.

In some embodiments, removable panels in the AST 1 and containment systems can be constructed to aid in the cleaning process of the solids that will form in the bottom of the system and apparatus. In an example, the removable panels in the AST 1 can line a floor of the AST 1 and solids can form on the removable panels. This feature can be exploited in the cleaning process by removing the panels for cleaning. The AST construction with removable panels also allows the quick construction and removal of the apparatus and system for the evaporation of produced water from oil and gas production and other dirty water sources, as described in this disclosure.

In some embodiments, a salt and electrical based chlorination or anti-bacterial chemical solution generating system may be integrated into the fluid system and apparatus described in this disclosure to minimize organic contamination from bacteria and other matters. These anti-bacterial solution generating, electrical charge-based systems such as those used in salt based swimming pools.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for a produced water evaporation system has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A system for the evaporation of water, the system comprising:
   a portable pond configured to hold the water, wherein the water is selected from the group consisting of produced water and dirty water; and
   a nozzle-based fluid projection system that includes fluid projection nozzles configured to project the water and a controller, wherein:
      the controller controls a fluid particle size with respect to the projected water, and
      the fluid particle size is based on a brine concentration associated with the water in the portable pond.

2. The system of claim 1, wherein at least one of a hydrocarbon separator and skimmer is fluidly coupled with the portable pond and is configured to collect hydrocarbons.

3. The system-of claim 1, wherein the fluid projection nozzles are arranged to vary a spray plume shape of a spray generated by the fluid projection nozzles.

4. The system of claim 1, wherein the fluid projection nozzles are arranged to vary a spray plume height of a spray generated by the fluid projection nozzles.

5. The system of claim 1, wherein the fluid projection nozzles are arranged to vary a spray plume particle diameter of a spray generated by the fluid projection nozzles.

6. The system of claim 1, wherein the fluid projection nozzles are arranged in a plurality of sectors that are independently controllable from one another.

7. The system of claim 1, wherein the fluid projection nozzles are arranged in a plurality of sectors that are independently controllable from one another, wherein any one of fluid particle size, spray plume shape, spray plume height, and spray plume density can be independently controlled in any one of the plurality of sectors.

8. The system of claim 1, wherein the fluid projection nozzles are arranged in controllable sectors that are independently controllable from one another, wherein any one of fluid particle size, spray plume shape, spray plume height, and spray plume density can be independently controlled in any one of the plurality of sectors according to an algorithm that optimizes evaporation verses a meteorological condition and a fluid chemical makeup that includes a brine concentration.

9. The system of claim 1, wherein the system incorporates at least one of an electrical charged based chlorine and anti-bacterial solution generator.

10. A system for the evaporation of water, the system comprising:
    a portable pond configured to hold water, wherein the water is selected from the group consisting of produced water and dirty water; and
    a nozzle-based fluid projection system that includes fluid projection nozzles configured to project the water and a controller, the nozzle based fluid projection system configured to evaporate over 500 barrels of water per day, wherein:
       the controller controls a fluid particle size with respect to the projected water, and
       the fluid particle size is based on a brine concentration associated with the water in the portable pond, and wherein the fluid particle size is decreased in response to an increased brine concentration.

11. A system for the evaporation of water, the system comprising:
    a portable pond configured to hold the water, wherein the water is selected from the group consisting of produced water and dirty water;
    a nozzle-based fluid projection system that includes fluid projection nozzles configured to project the water and a controller, wherein;
       the controller controls a fluid particle size with respect to the projected water, and
       the fluid particle soze is based on a brine concentration associated with the water in the portable pond, and wherein the fluid particle size is increased in response to a decreased brine concentration; and
    a multiple fluid retention system that includes at least 2 barriers that surround the portable pond.

\* \* \* \* \*